United States Patent [19]

Inagaki et al.

[11] Patent Number: 5,799,125
[45] Date of Patent: Aug. 25, 1998

[54] RARE EARTH DOPED OPTICAL FIBER

[75] Inventors: Shinya Inagaki, Kawasaki; Takeshi Sumiya, Sapporo, both of Japan

[73] Assignee: Fujitsu Limited, Kawasaki, Japan

[21] Appl. No.: 801,807

[22] Filed: Feb. 14, 1997

[30] Foreign Application Priority Data

Sep. 3, 1996 [JP] Japan ................... 8-233473

[51] Int. Cl.$^6$ ........................ G02B 6/22
[52] U.S. Cl. ........................ 385/127; 385/142
[58] Field of Search ................ 385/126, 127, 385/123, 141, 142; 372/6

[56] References Cited

U.S. PATENT DOCUMENTS

| | | | |
|---|---|---|---|
| 5,096,277 | 3/1992 | Kleineman | 385/127 |
| 5,363,463 | 11/1994 | Kleinerman | 385/123 |
| 5,491,581 | 2/1996 | Roba | 372/6 |

*Primary Examiner*—John Ngo
*Attorney, Agent, or Firm*—Staas & Halsey

[57] ABSTRACT

A rare earth doped optical fiber consisting of a first core doped with a rare earth element and having a relative index difference ranging from about 0.76% to about 1.5%, a second core surrounding the first core and having a relative index difference of about 1.8% or more, and a clad surrounding the second core. The refractive index of the first core is set smaller than the refractive index of the second core, and only the first core is doped with a rare earth element, thereby suppressing the influence of concentration quenching.

4 Claims, 9 Drawing Sheets

RARE EARTH DOPED OPTICAL FIBER

BACKGROUND OF THE INVENTION

1. Field of the Invention

The present invention relates to a rare earth doped optical fiber, and more particularly to a high-efficient rare earth doped optical fiber that has suppressed concentration quenching as a cause of degradation of power conversion efficiency.

2. Description of the Related Art

An optical amplifier for directly amplifying an optical signal as it stands without converting the optical signal into an electrical signal is widely studied as one of key devices of an optical communication system in many research institutes and is partially put into practical use from a viewpoint that the optical amplifier does not depend on a bit rate in fact, so large-capacity transmission is allowed and from another viewpoint that collective amplification of many channels is allowed. An optical fiber using a rare earth doped fiber has excellent features of no polarization dependence, low noise, and low connection loss to a transmission line (optical fiber). From this viewpoint, optimization of its configuration is now being groping for.

The principle of optical amplification by the rare earth doped fiber is as follows:

When pump light is input into an optical fiber whose core is doped with erbium (Er), Er atoms are excited to a high energy level. When an optical signal enters the Er atoms thus excited to the high energy level, there occurs transition of the high energy level to a low energy level of the Er atoms. At this time, stimulated emission of light occurs, causing a gradual increase in power of the optical signal along the optical fiber, thus effecting amplification of the optical signal. In a conventional rare earth doped fiber, a doping concentration of a rare earth element in the core is uniform in a longitudinal direction and a radial direction of the fiber in general.

To increase an amplification efficiency of a rare earth doped optical fiber, it is necessary to increase the efficiency of conversion from pump light power to optical signal power. Recently, concentration quenching of a rare earth doped fiber dependent on a concentration of a rare earth element contained in the core has received attention as a factor of adverse effects on the efficiency of conversion from pump light power to optical signal power.

However, it can be said that research on the concentration quenching has not so advanced, and it is merely known in the art that the effect of the concentration quenching of a rare earth doped fiber qualititatively becomes low by a decrease in concentration of a rare earth element contained in the core. Accordingly, to quantitatively grasp a glass material of a rare earth doped optical fiber suppressing the concentration quenching, it is necessary to quantify the concentration quenching and clarify the glass material dependence of the concentration quenching.

SUMMARY OF THE INVENTION

It is therefore an object of the present invention to provide a high-efficient rare earth doped optical fiber which can suppress the concentration quenching.

In accordance with an aspect of the present invention, there is provided a rare earth doped optical fiber comprising a first core doped with a rare earth element, said first core having a relative index difference ranging from about 0.76% to about 1.5%; a second core surrounding said first core, said second core having a relative index difference of about 1.8% or more; and a clad surrounding said second core.

Preferably, the relative index difference of the second core is about 1.9% or more, and the diameter of the first core is ½ or less of the diameter of the second core. Preferably, the rare earth element is erbium (Er), and the concentration of Er contained in the first core ranges from about 193 ppm to about 473 ppm.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

First, quantification of concentration quenching was carried out to obtain a high-efficient erbium (Er) doped optical fiber by suppressing the influence of concentration quenching. The phenomenon of concentration quenching can be confirmed by generation of fluorescence having a wavelength of 980 nm when pump light having a wavelength of 1480 nm is input into an Er doped fiber as shown in FIG. 1, because Er absorbs the pump light.

Figure 1:
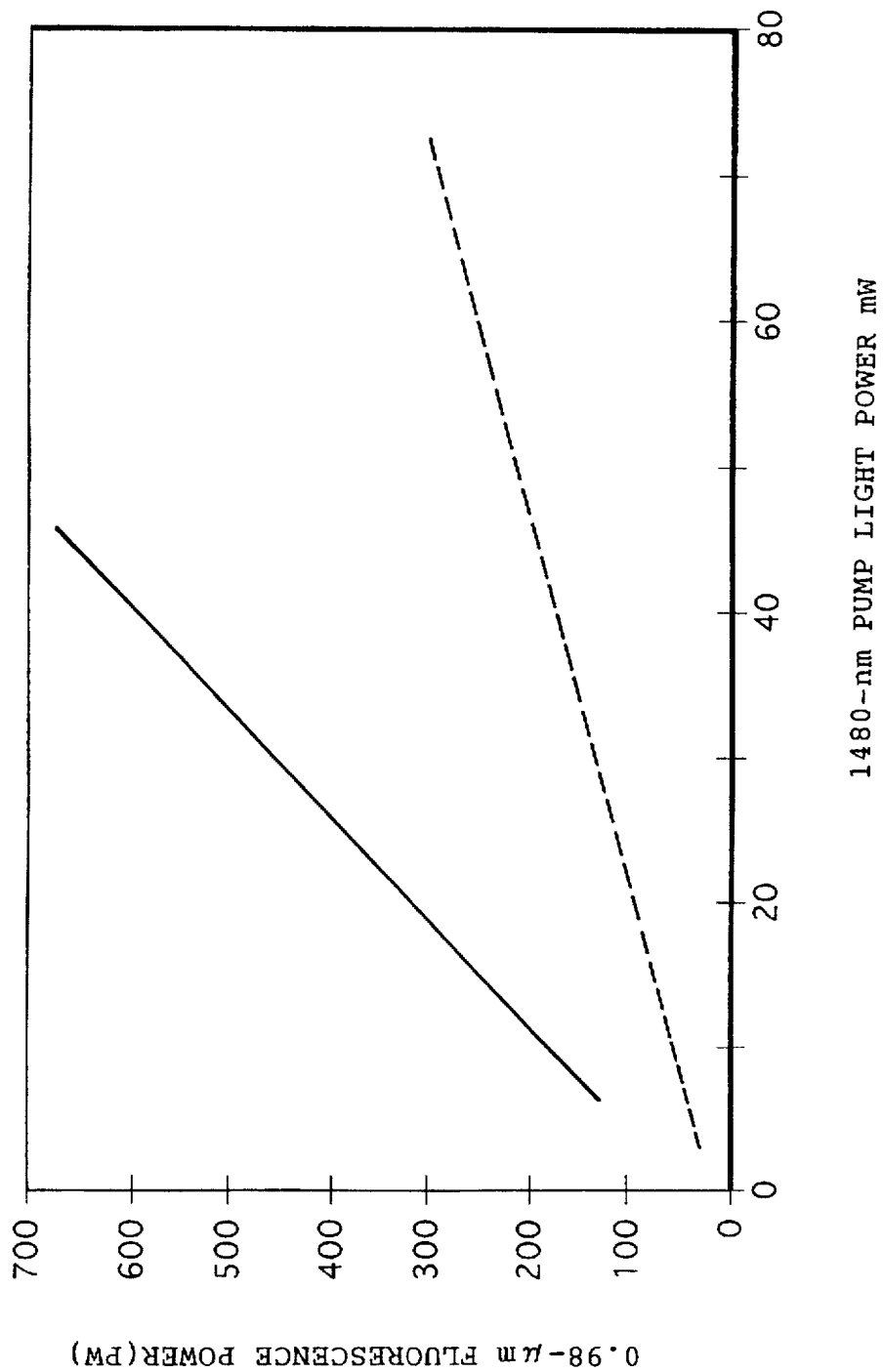
FIG. 1 is a graph showing the relation between pump light power and fluorescence power.

In FIG. 1, the solid line shows the relation between pump light power and fluorescence power in an Er doped fiber having an Er concentration of 1000 ppm, and the broken line shows the relation between pump light power and fluorescence power in an Er doped fiber having an Er concentration of 300 ppm. The higher the Er concentration, the larger the fluorescence power. As apparent from FIG. 1, the fluorescence power at 980 nm increases with a constant slope with respect to an increase in the pump light power at 1480 nm.

Figure 2:
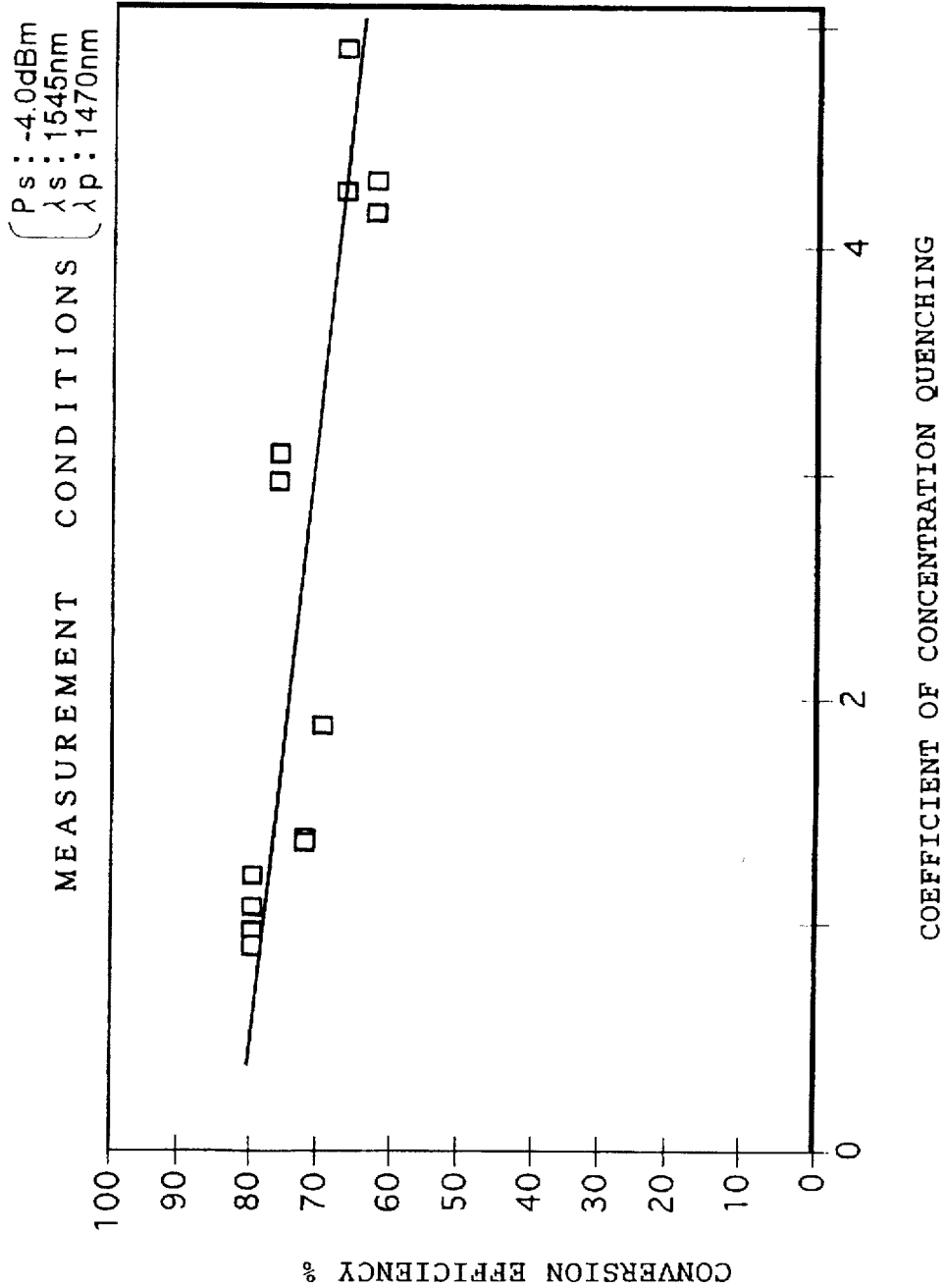
FIG. 2 is a graph showing the relation between coefficient of concentration quenching and conversion efficiency.

Further, the fluorescence power at 980 nm is considered to be proportional to an Er concentration and a fiber length in an Er doped fiber having a constant concentration quenching. Accordingly, the fluorescence power at 980 nm can be standardized by the Er concentration and the fiber length. In the present invention, a coefficient of concentration quenching is defined as an increase in the fluorescence power at 980 nm with respect to an increase in the pump light power at 1480 nm per unit Er concentration multiplied by unit fiber length. That is, letting ζ denote the slope of the straight line in the graph shown in FIG. 1, a coefficient of concentration quenching α can be expressed as follows:

ζ=ζ/(unit Er concentration×unit fiber length) Referring to FIG. 2, there is shown the relation between coefficient of concentration quenching and efficiency of conversion from pump light power to optical signal power. Measurement conditions are an optical signal power of −4.0 dBm, an optical signal wavelength of 1545 nm, and a pump light wavelength of 1470 nm. As apparent from FIG. 2, the conversion efficiency decreases with an increase in the coefficient of concentration quenching. Therefore, the coefficient of concentration quenching must be made as small as possible in order to maintain a high conversion efficiency. The graph shown in FIG. 2 shows the efficiency of conversion from pump light power to optical signal power with structure loss removed.

Figure 3:
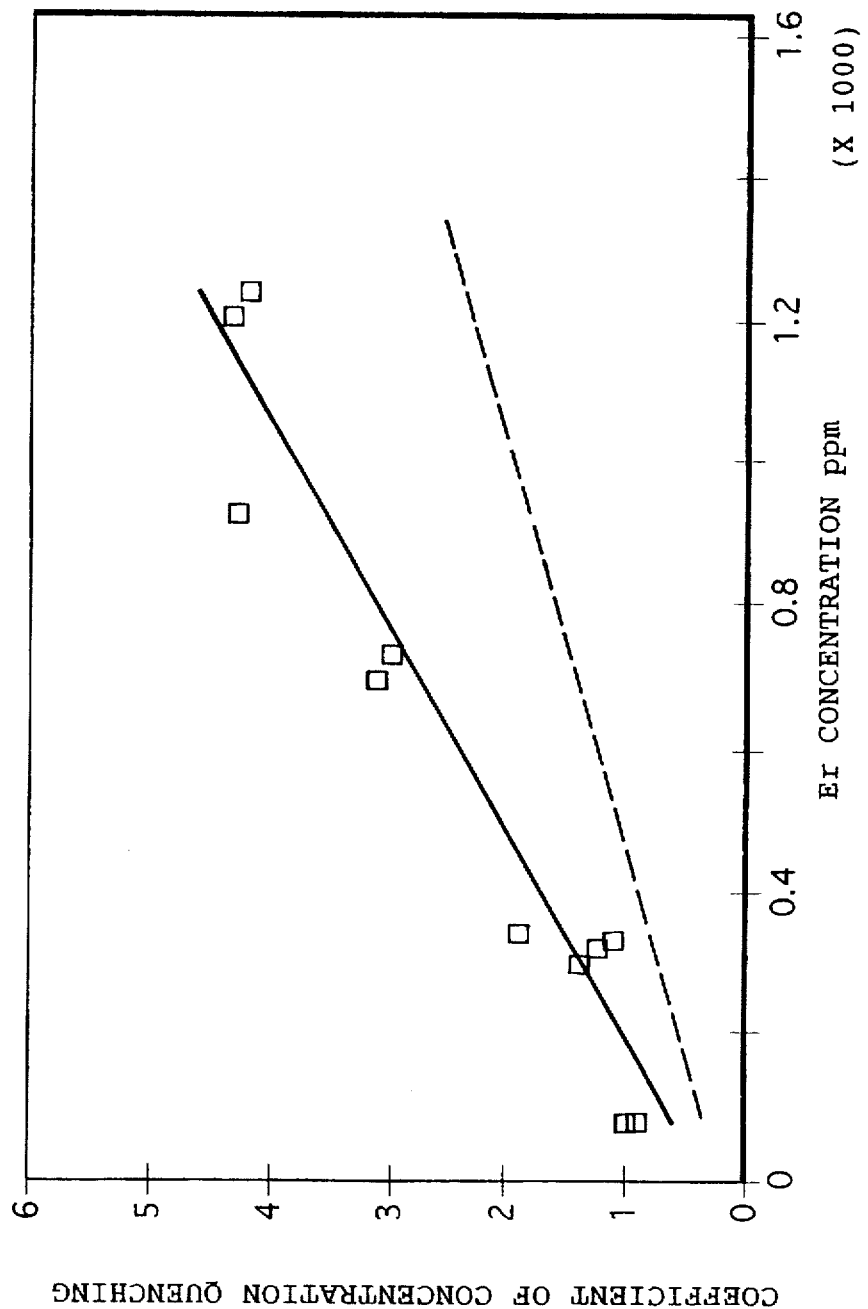
FIG. 3 is a graph showing the relation between Er concentration and coefficient of concentration quenching.

Referring to FIG. 3, there is shown the relation between Er concentration and coefficient of concentration quenching in an optical fiber having a substantially constant germanium (Ge) concentration in the core. In FIG. 3, the solid line shows the case where the relative index difference of the core is 2%, and the broken line shows the case where the relative index difference of the core is 1%. As apparent from this graph, the coefficient of concentration quenching is proportional to the Er concentration, and it is estimated that a glass material having less concentration quenching shows a small value of the slope ζ=the coefficient of concentration quenching/the Er concentration.

Figure 4:
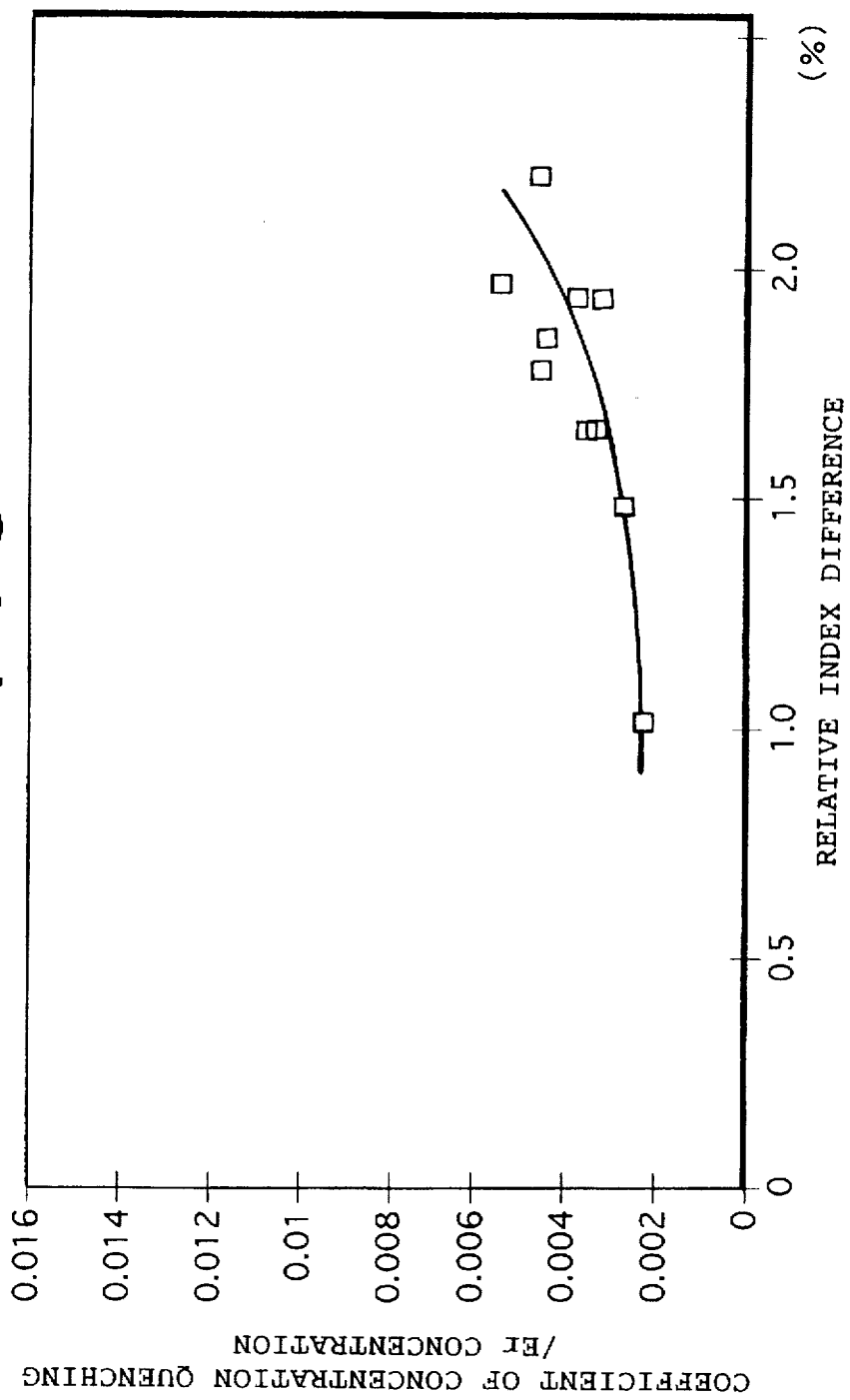
FIG. 4 is a graph showing the relation between coefficient of concentration quenching/Er concentration and relative index difference.

FIG. 4 shows the relation between ζ and relative index difference, that is, the Ge concentration dependence of ζ. It is observed from FIG. 4 that concentration quenching occurs more easily with an increase in Ge concentration, that is, an increase in relative index difference, and that when the relative index difference Δ exceeds about 1.5%, ζ=(coefficient of concentration quenching/Er concentration) rapidly increases. Accordingly, to suppress the concentration quenching, it is necessary to suppress the relative index difference of the core at its Er doped portion to about 1.5% or less. In general, the amplification efficiency of an Er doped fiber is increased by increasing an energy density in an Er doped region. Increasing the energy density is effected by increasing the relative index difference of the core to thereby improve the confinement of light in the core.

Figure 5:
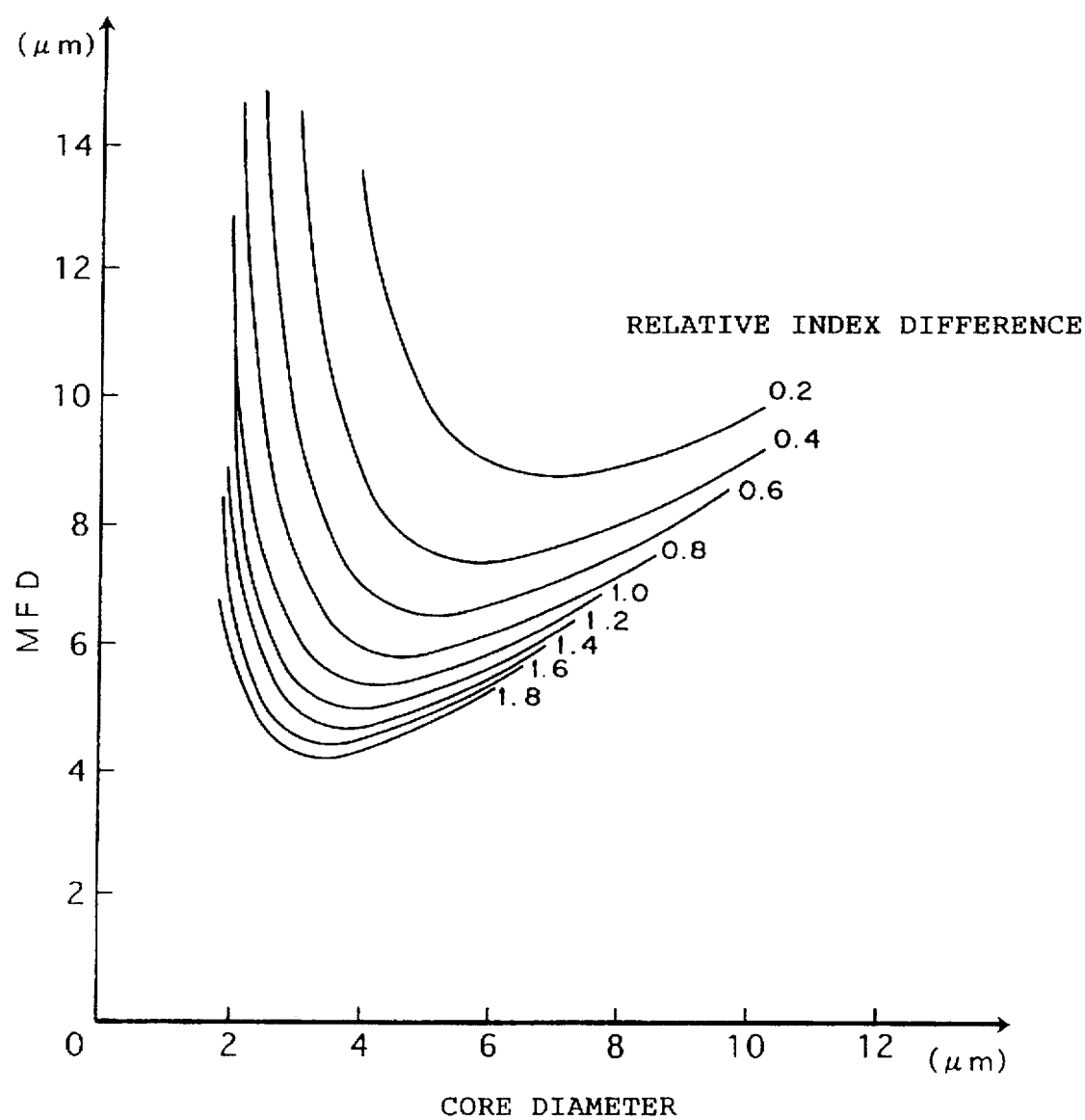
FIG. 5 is a graph showing a change in MFD with a change in relative index difference.

FIG. 5 shows the results of calculation of a mode field diameter (MFD) using a relative index difference as a parameter. The MFD decreases with an increase in the relative index difference. The power conversion efficiency of an Er doped fiber is improved with a decrease in the MFD. To obtain a sufficiently large energy density in an Er doped region, the relative index difference Δ of the core is set to preferably about 1.8% or more, more preferably about 1.9% or more.

Figure 6:
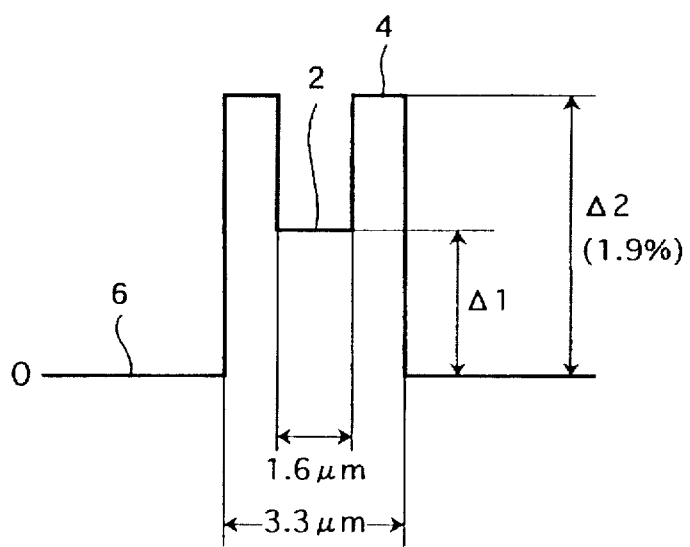
FIG. 6 is a representation showing a refractive index distribution of an Er doped fiber used in a test shown in FIG. 7.

As mentioned above, the relative index difference of the core must be set to about 1.5% or less in order to suppress the concentration quenching. On the other hand, the relative index difference Δ is preferably about 1.8% or more in order to obtain a sufficiently large energy density in the Er doped region. Therefore, no relative index difference Δ satisfying both the concentration quenching and the energy density is present. In view of this fact, the present invention has proposed an Er doped fiber having a double-core structure of two core portions different in refractive index from each other such that the refractive index of an Er doped central core region in respect of a fiber refractive index distribution is smaller than the refractive index of the other core region surrounding the central core region. FIG. 6 shows the refractive index distribution of the Er doped optical fiber according to the present invention.

Figure 7:
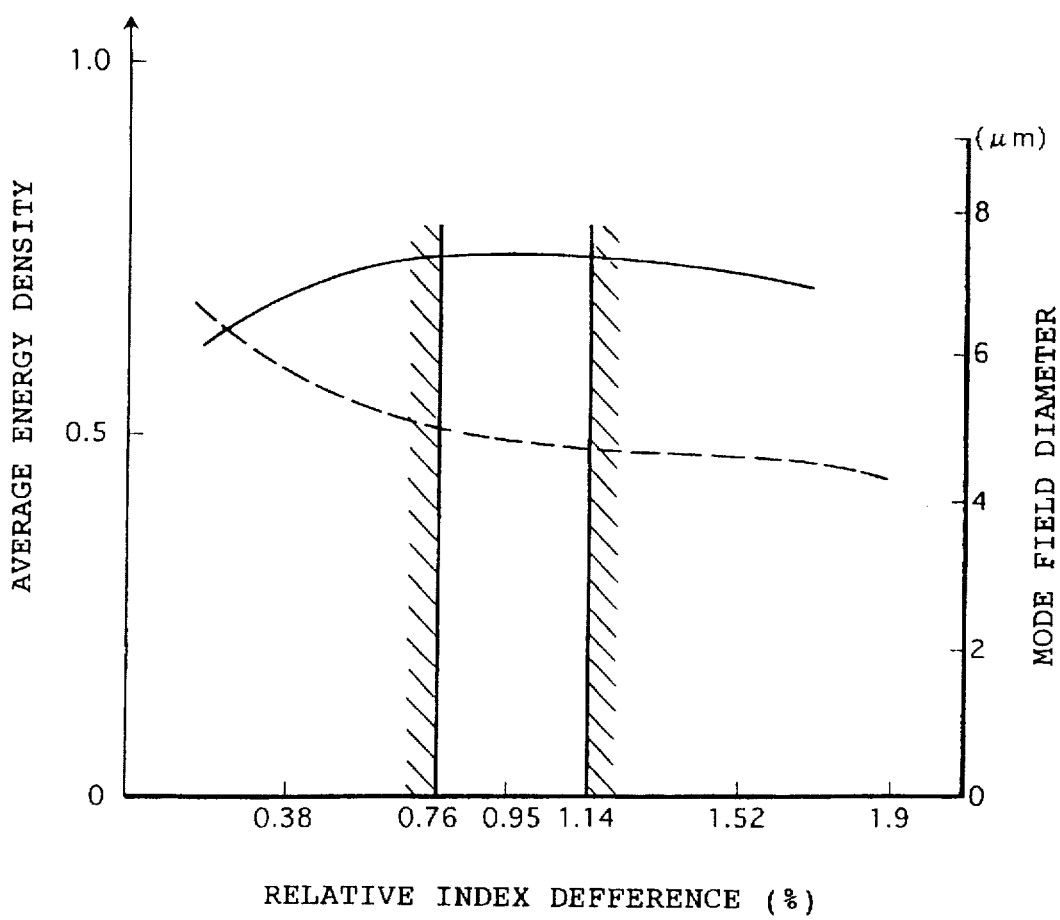
FIG. 7 is a graph showing the relation between relative index difference of an Er doped core portion and energy density/mode field diameter.

In the distribution shown in FIG. 6, the Er doped optical fiber according to the present invention has a central core portion 2 having a relative index difference Δ1 and a surrounding core portion 4 having a relative index difference Δ2. Reference numeral 6 denotes a clad. To obtain a good effect of light confinement in the central core portion 2, the diameter of the central core portion 2 is set to preferably ½ or less of the diameter of the surrounding core portion 4. FIG. 7 shows an average energy density(solid line) and a mode field diameter(broken line) when the relative index difference Δ1 of the central core portion 2 is changed under the conditions that the diameter of the central core portion 2 is set to 1.6 μm, the diameter of the surrounding core portion 4 is set to 3.3 μm, and the relative index difference Δ2 of the surrounding core portion 4 is set to 1.9%.

It is understood from FIG. 7 that although the relative index difference of the central core portion 2 is gradually reduced, the average energy density does not so change, and a sufficiently large energy density is obtained even at a value of the relative index difference Δ down to 0.76%. On the basis of the above examination, it is understood that a high-efficient low-concentration quenching fiber can be realized by a double-core structure of two core portions different in refractive index from each other. That is, the relative index difference of the surrounding core portion is about 1.8% or more, preferably about 1.9% or more.

On the other hand, the relative index difference of the central core portion is preferably about 1.5% or less to suppress the concentration quenching, and is preferably about 0.76% or more to obtain a sufficiently large energy density. Accordingly, a preferable range of the relative index difference Δ1 of the central core portion is 0.76≦Δ1≦1.5%. The realization of the Er doped fiber having a double-core structure is allowed by a usual fabrication method. That is, the fiber is fabricated by doping the central core portion with Er and a relatively low concentration of Ge, and doping the surrounding core portion with a relatively high-concentration of Ge.

Figure 8A:
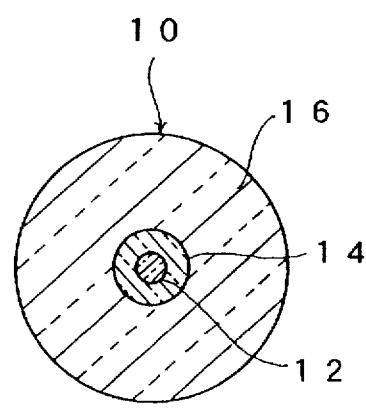
FIG. 8A is a cross section of an Er doped fiber according to a preferred embodiment of the present invention.
Figure 8B:
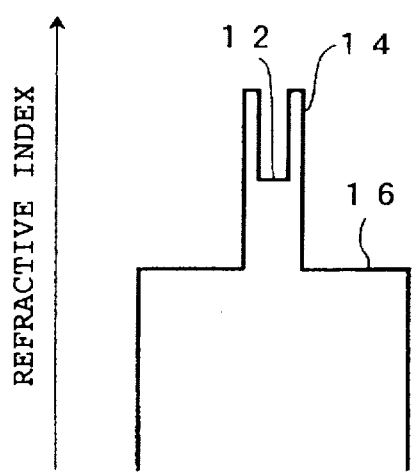
FIG. 8B is a representation showing a refractive index distribution of the fiber shown in FIG. 8A.

Referring to FIG. 8A, there is shown a cross section of an Er doped optical fiber 10 according to a preferred embodiment of the present invention, and FIG. 8B shows a refractive index distribution of the Er doped optical fiber 10. The Er doped optical fiber 10 is composed of a central core portion 12 having a relatively small relative index difference, a surrounding core portion 14 having a relatively large relative index difference, and a clad 16. In the Er doped optical fiber 10 according to this preferred embodiment, the relative index difference of the central core portion 12 is set to about 1.0%, and the relative index difference of the surrounding core portion 14 is set to about 1.9%. The central core portion 12 is preferably doped with aluminum (Al) as an additional dopant. By doping the Er doped central core portion 12 with Al, the amplification band of an optical signal can be widened. The Er doped optical fiber 10 is formed of quartz glass.

Figure 9:
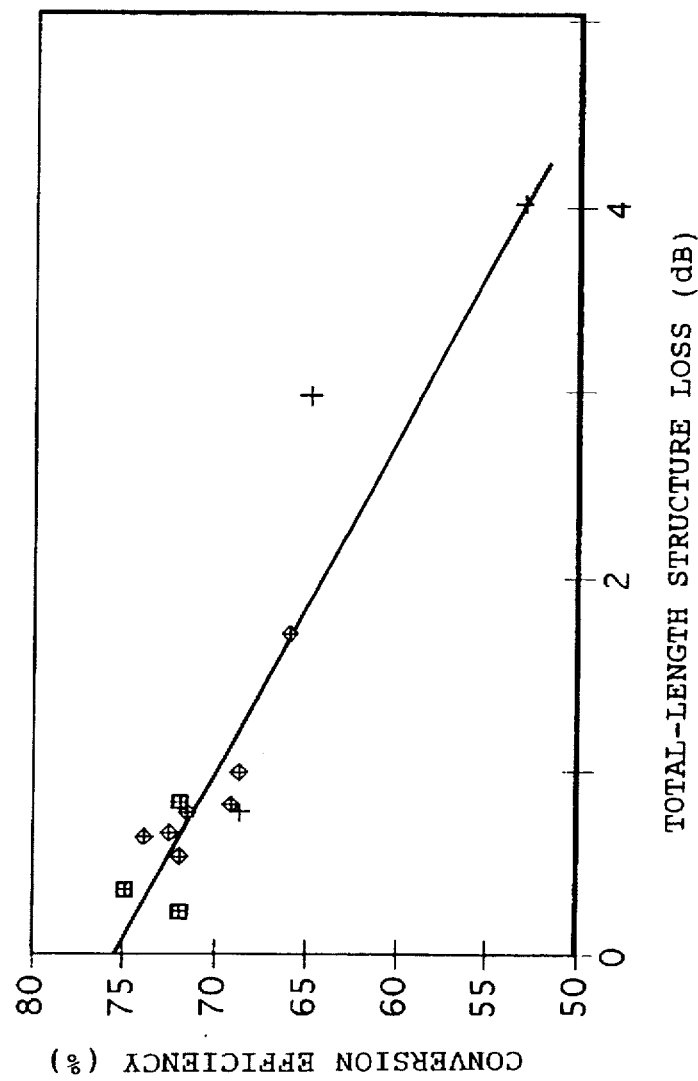
FIG. 9 is a graph showing the relation between total-length structure loss and decrease in conversion efficiency.

There will now be calculated an Er doping concentration that can suppress the concentration quenching and obtain a sufficiently large average energy density in the case where the Er doped optical fiber 10 is used. In the case that an Er doped fiber is used as a post-amplifier, it is usually necessary to set the product of a fiber length and an Er concentration to $1.5 \times 10^4$ m×ppm. The structure loss of an Er doped fiber is 5 to 20 dB/km, and a decrease in conversion efficiency with respect to a total-length structure loss is about 6%/dB as apparent from FIG. 9.

Assuming that the Er concentration of the Er doped fiber is X ppm, the fiber length becomes $1.5 \times 10^4/X$ (m), and the total-length structure loss becomes 5 to $20 \times 1.5 \times 10/X$ (dB). Accordingly, a decrease in conversion efficiency on the basis of the structure loss becomes as follows:

$$5 \text{ to } 20 \times 1.5 \times 10 \times 6/X \ \% = 5 \text{ to } 20 \times 90/X \ \% \tag{1}$$

On the other hand, the concentration quenching must be suppressed to a sufficiently small amount, so that the coefficient of concentration quenching becomes 2 to $3 \times 10^{-3} \times X$ from the graph shown in FIG. 4. In this case, a decrease in conversion efficiency on the basis of the concentration quenching becomes from FIG. 2 as follows:

$$2 \text{ to } 3 \times 10^{-3} \times X \times 4\% = 8 \text{ to } 12 \times 10^{-3} \times X \tag{2}$$

A decrease in total conversion efficiency is equal to the sum of (1) and (2), so that this decrease becomes as follows:

$$(5 \text{ to } 20 \times 90/X) + (8 \text{ to } 12 \times 10^{-3} \times X) \tag{3}$$

A minimum value of X minimizing Eq. (3) under the conditions that the structure loss is 5 dB/km and the of concentration quenching is 12 becomes as follows:

$$\{5 \times 90/(12 \times 10^{-3})\}^{1/2} = 193 \text{ ppm}$$

A maximum value of X minimizing Eq. (3) under the conditions that the structure loss is 20 dB/km and the coefficient of concentration quenching is 8 becomes as follow:

$$\{20 \times 90/(8 \times 10^{-3})\}^{1/2} = 473 \text{ ppm}$$

According to the present invention, it is possible to provide a rare earth doped optical fiber suppressing the concentration quenching and maintaining a sufficient large average energy density, and can improve the efficiency of conversion from pump light power to optical power.

What is claimed is:

1. A rare earth doped optical fiber comprising:

a first core doped with a rare earth element, said first core having a relative index difference ranging from about 0.76% to about 1.5%;

a second core surrounding said first core, said second core having a relative index difference of about 1.8% or more; and a clad surrounding said second core.

2. A rare earth doped optical fiber according to claim 1, wherein said second core has a relative index difference of about 1.9% or more, and a diameter of said first core is ½ or less of a diameter of said second core.

3. A rare earth doped optical fiber according to claim 1, wherein said first core has a relative index difference ranging from about 1.0% to about 1.5%, and said rare earth element comprises erbium, a concentration of said erbium ranging from about 193 ppm to about 473 ppm.

4. A rare earth doped optical fiber according to claim 1, wherein said first core is doped with germanium and aluminum, and said second core is doped with germanium.

* * * * *

UNITED STATES PATENT AND TRADEMARK OFFICE
CERTIFICATE OF CORRECTION

PATENT NO. : 5,799,125

DATED : August 25, 1998

INVENTOR(S) : Inagaki et al.

It is certified that error appears in the above-indentified patent and that said Letters Patent is hereby corrected as shown below:

Col. 3, line 8, "ʃ" should be --a--; after "length)" START A NEW PARAGRAPH with "Referring".

Col. 5, line 27, after "the" insert --coefficient--.
(2nd occurrence)

Col. 6, line 7, after "optical" insert --signal--.

Signed and Sealed this

Sixteenth Day of February, 1999

Attest:

*Attesting Officer*

*Acting Commissioner of Patents and Trademarks*